United States Patent
Qin et al.

(10) Patent No.: US 12,056,841 B2
(45) Date of Patent: Aug. 6, 2024

(54) METHOD FOR IMAGE SHAPE TRANSFORMATION BASED ON GENERATIVE ADVERSARIAL NETWORK

(71) Applicant: UNIVERSITY OF ELECTRONIC SCIENCE AND TECHNOLOGY OF CHINA, Chengdu (CN)

(72) Inventors: Zhen Qin, Chengdu (CN); Yi Ding, Chengdu (CN); Tianming Zhuang, Chengdu (CN); Fuhu Deng, Chengdu (CN); Zhiguang Qin, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 402 days.

(21) Appl. No.: 17/450,692

(22) Filed: Oct. 13, 2021

(65) Prior Publication Data

US 2022/0318946 A1    Oct. 6, 2022

(30) Foreign Application Priority Data

Mar. 31, 2021 (CN) .......................... 202110347463.5

(51) Int. Cl.
*G06T 3/00*    (2024.01)
*G06N 3/045*    (2023.01)
*G06T 7/11*    (2017.01)

(52) U.S. Cl.
CPC .............. *G06T 3/00* (2013.01); *G06N 3/045* (2023.01); *G06T 7/11* (2017.01)

(58) Field of Classification Search
CPC ... G06T 3/00; G06T 7/11; G06T 2207/20081; G06T 2207/20084; G06T 7/194;
(Continued)

(56) References Cited

U.S. PATENT DOCUMENTS 11,158,121 B1* 10/2021 Tung ...................... G06N 3/045
2019/0197358 A1* 6/2019 Madani ................. G06N 3/045
(Continued)

FOREIGN PATENT DOCUMENTS

CN    109325951 A    2/2019
CN    110659727 A    1/2020
(Continued)

OTHER PUBLICATIONS

Alaa Abu-Srhan, Mohammad A.M. Abushariah, Omar S. Al-Kadi, "The effect of loss function on conditional generative adversarial networks". . . Journal of King Saud University—Computer and Information Sciences, Oct. 2022, pp. 6977-6988 vol. 34, Issue 9, (Year: 2022).*
(Continued)

*Primary Examiner* — Mia M Thomas
(74) *Attorney, Agent, or Firm* — Bayramoglu Law Offices LLC

(57) ABSTRACT

A generative adversarial network used for image shape transformation. The image shape transformation includes generating a segmentation mask of an image to be transformed and constructing a generator and a discriminator. The image shape transformation further includes constructing the generative adversarial network through the generator and the discriminator, constructing a loss function, training the generative adversarial network by a gradient descent method according to the loss function, and inputting the segmentation mask of the image to be transformed into the trained generative adversarial network to obtain an image shape transformation result.

7 Claims, 7 Drawing Sheets

(58) Field of Classification Search
CPC .......... G06T 2207/10004; G06N 3/045; G06N 3/048; G06N 3/084; G06N 3/0464; G06N 3/0475; G06N 3/094; G06N 3/08; G06F 18/2132; G06F 18/22; G06V 10/267
See application file for complete search history.

(56) References Cited

U.S. PATENT DOCUMENTS

| | | | | |
|---|---|---|---|---|
| 2019/0197368 | A1* | 6/2019 | Madani | G16H 30/40 |
| 2019/0198156 | A1* | 6/2019 | Madani | G06N 3/082 |
| 2020/0073968 | A1* | 3/2020 | Zhang | G06F 16/137 |
| 2021/0012486 | A1* | 1/2021 | Huang | G06N 3/047 |
| 2021/0063559 | A1* | 3/2021 | Tzadok | G01S 13/886 |
| 2021/0385081 | A1* | 12/2021 | Ding | H04L 9/0656 |
| 2021/0398334 | A1* | 12/2021 | He | G06T 11/60 |
| 2022/0373673 | A1* | 11/2022 | Sur | G06V 10/774 |
| 2023/0408682 | A1* | 12/2023 | Gubbi Lakshminarasimha | G01S 13/9027 |

FOREIGN PATENT DOCUMENTS

| | | |
|---|---|---|
| CN | 111429405 A | 7/2020 |
| CN | 111899160 A | 11/2020 |
| CN | 113674154 B * | 10/2023 |
| WO | 2021013020 A1 | 1/2021 |

OTHER PUBLICATIONS

Yao Zhe-Wei, et al., Improved CycleGANs for Intravascular Ultrasound Image Enhancement, Computer Science, 2019, pp. 221-227, vol. 46 No. 5.

Hao Chen, et al., Brain Tumor Segmentation with Generative Adversarial Nets, 2019 2nd International Conference on Artificial Intelligence and Big Data, 2019, pp. 301-305.

Han Xue, et al., Realistic Talking Face Synthesis with Geometry-Aware Feature Transformation, ICIP, 2020, pp. 1581-1585.

* cited by examiner

METHOD FOR IMAGE SHAPE TRANSFORMATION BASED ON GENERATIVE ADVERSARIAL NETWORK

CROSS REFERENCE TO THE RELATED APPLICATIONS

This application is based upon and claims priority to Chinese Patent Application No. 202110347463.5, filed on Mar. 31, 2021, the entire contents of which are incorporated herein by reference.

TECHNICAL FIELD

The present invention relates to the field of image translation, and specifically relates to a method for image shape transformation based on a generative adversarial network.

BACKGROUND

Adversarial neural network models have achieved remarkable success in many applications, such as image inpainting, semantic segmentation, image caption, video generation, and style conversion. Image translation is one of the main research topics in computer vision. In recent years, the development of generative adversarial networks has led to significant advancements in the field of image translation. When paired training data from two different domains are given, the model can be trained in a supervised manner by using a conditional generative adversarial network. When there is a lack of paired data sets, image-to-image translation can be realized by using an unsupervised cycle generative adversarial network and self-consistency loss.

However, technologies in this field mostly focus on the conversion task between the styles of two similar shapes, such as season transfer, selfie-to-amine, and style conversion, but lack satisfactory performance in the conversion task between objects with different shapes.

SUMMARY

In view of the above-mentioned shortcomings in the prior art, the present invention provides a method for image shape transformation based on a generative adversarial network to solve the problems identified in the prior art.

In order to achieve the above-mentioned objective, the present invention adopts the following technical solution, A method for image shape transformation based on a generative adversarial network includes the following steps:

S1: generating a segmentation mask of an image to be transformed;
S2: constructing a generator and a discriminator, and constructing the generative adversarial network through the generator and the discriminator;
S3: constructing a loss function;
S4: training the generative adversarial network by a gradient descent method according to the loss function; and
S5: inputting the segmentation mask of the image to be transformed into the trained generative adversarial network to obtain an image shape transformation result.

Further, step S1 specifically includes: generating, for the image to be transformed, a segmentation mask $m_x$ in a source domain X and a segmentation mask $m_y$ in a target domain Y.

Further, in step S2, the generator includes a down-sampling module, a first residual network module, a second residual network module, a third residual network module, a fourth residual network module, a fifth residual network module, a sixth residual network module and an up-sampling module that are connected in sequence.

The down-sampling module includes a first padding layer, a first convolutional layer, a first instance normalization layer, a first activation layer, a second convolutional layer, a second instance normalization layer, a second activation layer, a third convolutional layer, a third instance normalization layer and a third activation layer that are connected in sequence.

Each of the residual network modules includes a second padding layer, a fourth convolutional layer, a fourth instance normalization layer, a fourth activation layer, a third padding layer, a fifth convolutional layer and a fifth instance normalization layer that are connected in sequence.

The up-sampling module includes a first deconvolutional layer, a sixth instance normalization layer, a fifth activation layer, a second deconvolutional layer, a seventh instance normalization layer, a sixth activation layer, a fourth padding layer, a sixth convolutional layer and a seventh activation layer that are connected in sequence.

Further, in step S2, the discriminator includes a seventh convolutional layer, a first switchable normalization layer, a first maximum activation layer, an eighth convolutional layer, a second switchable normalization layer, an eighth instance normalization layer, a second maximum activation layer, an eighth convolutional layer, a third switchable normalization layer, a ninth instance normalization layer, a third maximum activation layer, a third deconvolutional layer, a fourth switchable normalization layer, a tenth instance normalization layer, a fourth maximum activation layer, a fourth deconvolutional layer and a fifth switchable normalization layer that are connected in sequence.

Further, in step S2, a method for constructing the generative adversarial network through the generator and the discriminator specifically includes:

S2.1: constructing a generator $G_{XY}$ for converting a given image in the source domain X to an image in the target domain Y, and constructing a generator $G_{YX}$ for converting a given image in the target domain Y to an image in the source domain X;

S2.2: constructing a discriminator $D_Y$ for predicting whether the image is an image in the target domain, and constructing a discriminator $D_X$ for predicting whether the image is an image in the source domain; and S2.3: connecting the generator $G_{XY}$ to the generator $G_{YX}$, connecting the generator $G_{XY}$ to the discriminator $D_Y$, and connecting the generator $G_{YX}$ to the discriminator $D_X$ to construct the generative adversarial network.

Further, in step S2.3, a one-cycle generation process of the generative adversarial network includes a source domain cycle generation process and a target domain cycle generation process.

The source domain cycle generation process specifically includes:

S2.3.1.1: inputting a source domain image x and its segmentation mask $m_x$ into the generator $G_{XY}$ to obtain a first target domain generated image y' and its segmentation mask $m'_y$, which are denoted as $G_{XY}(x, m_x)$;

S2.3.1.2: inputting the target domain generated image y' and its segmentation mask into the generator $G_{YX}$ to obtain a first source domain generated image and its segmentation mask, which are denoted as $G_{YX}(G_{XY}(x, m_x))$ S2.3.1.3: inputting the first target domain generated image y' and its mask $m'_y$, as well as a target domain image y and its segmentation mask $m_y$, into the discriminator $D_Y$ for discrimination, and inputting $G_{YX}(G_{XY}(x,m_x))$ denoting the first source domain generated image and its segmentation mask into the discriminator $D_X$ for discrimination, so as to complete the source domain cycle generation process.

The target domain cycle generation process specifically includes:

S2.3.2.1: inputting the target domain image y and its segmentation mask $m_y$ into the generator $G_{YX}$ to obtain a second source domain generated image X' and its segmentation mask $m'_x$, which are denoted as $G_{YX}(y, m_y)$;

S2.3.2.2: inputting the second source domain generated image x' and its segmentation mask $m'_x$ into the generator $G_{XY}$ to obtain a second target domain generated image and its segmentation mask, which are denoted as $G_{XY}(G_{YX}(y,m_y))$;

S2.3.2.3: inputting the second source domain generated image x' and its segmentation mask $m'_x$, as well as the source domain image x and its segmentation mask $m_x$ into the discriminator $D_X$ for discrimination, and inputting the second target domain generated image and its segmentation mask $G_{XY}(G_{YX}(y,m_y))$ into the discriminator $D_Y$ for discrimination, so as to complete the target domain cycle generation process.

Further, in step S3, the loss function $\mathcal{L}_{total}$ is specifically expressed as:

$$\mathcal{L}_{total}=\lambda_{adv}\mathcal{L}_{adv}+\lambda_{cyc}\mathcal{L}_{cyc}+\lambda_{idt}\mathcal{L}_{idt}+\lambda_{ctx}\mathcal{L}_{ctx}+\lambda_{fs}\mathcal{L}_{fs};$$

wherein $\mathcal{L}_{adv}$ represents an adversarial loss function, $\mathcal{L}_{cyc}$ represents a cycle consistency loss function, $\mathcal{L}_{idt}$ represents an identity loss function, $\mathcal{L}_{ctx}$ represents a context-preserving loss function, $\mathcal{L}_{fs}$ represents a feature similarity loss function, and $\lambda_{adv}, \lambda_{cyc}, \lambda_{idt}, \lambda_{ctx}$ and $\lambda_{fs}$ represent weights of $\mathcal{L}_{adv}, \mathcal{L}_{cyc}, \mathcal{L}_{idt}, \mathcal{L}_{ctx}$ and $\mathcal{L}_{fs}$ in the loss function $\mathcal{L}_{total}$, respectively.

Further, the adversarial loss function $\mathcal{L}_{adv}$ is specifically expressed as:

$$\mathcal{L}_{adv}=(D_X(x,m_x)-1)^2+D_X(G_{YX}(y,m_y))^2+(D_Y(y,m_y)-1)^2+D_Y(G_{XY}(x,m_x))^2;$$

wherein, $D_X(x, m_x)$ represents a discriminant output of the discriminator $D_X$ for the source domain image x and its segmentation mask $m_x$, $D_X(G_{YX}(y,m_y))$ represents a discriminant output of the discriminator $D_X$ for $G_{YX}(y,m_y)$ denoting the source domain generated image and its segmentation mask, $G_{YX}(y,m_y)$ represents the source domain generated image and its mask generated by the target domain image y and its segmentation mask $m_y$ through the generator $G_{YX}$, $D_Y(y,m_y)$ represents a discriminant output of the discriminator $D_Y$ for the target domain image y and its segmentation mask $m_y$, $D_Y(G_{XY}(x,m_x))$ represents a discriminant output of the discriminator $D_Y$ for $G_{XY}(x,m_x)$ denoting the target domain generated image and its segmentation mask, and $G_{XY}(x,m_x)$ represents the target domain generated image and its segmentation mask generated by the source domain image x and its segmentation mask $m_x$ through the generator $G_{XY}$.

The cycle consistency loss function $\mathcal{L}_{cyc}$ is specifically expressed as:

$$\mathcal{L}_{cyc}=\|G_{YX}(G_{XY}(x,m_x))-(x,m_x)\|_1+\|G_{XY}(G_{YX}(y,m_y))-(y,m_y)\|_1;$$

wherein $G_{YX}(G_{XY}(x,m_x))$ represents the source domain generated image and its segmentation mask generated by $G_{XY}(x, m_x)$ through the generator $G_{YX}$, $G_{XY}(G_{YX}(y,m_y))$ represents the target domain generated image and its segmentation mask generated by $G_{YX}(y,m_y)$ through the generator $G_{XY}$ and represents $\|*\|_1$ 1-norm.

The identity loss function $\mathcal{L}_{idt}$ is specifically expressed as:

$$\mathcal{L}_{idt}=\|G_{XY}(y,m_y)-(y,m_y)\|_1+\|G_{YX}(x,m_x)-(x,m_x)\|_1;$$

wherein $G_{XY}(y,m_y)$ represents the segmentation mask of the first target domain generated image y obtained after the source domain image x and its segmentation mask $m_x$ are input into the generator $G_{XY}$, and $G_{YX}(x,m_x)$ represents the segmentation mask of the second source domain generated image x' obtained after the target domain image y and its segmentation mask $m_y$ are input into the generator $G_{YX}$.

The context-preserving loss function $\mathcal{L}_{ctx}$ is specifically expressed as:

$$\mathcal{L}_{ctx}=\|\omega(m_x,m'_y)e(x-y')\|_1+\|\omega(m_y,m'_x)e(y-x')\|_1;$$

wherein $\omega(m_x, m'_y)$ represents a minimum value obtained by subtracting one from elements in binary object masks through segmentation masks $m_x$ and $m'_y$, and $\omega(m_y,m'_x)$ represents a minimum value obtained by subtracting one from elements in binary object masks through segmentation masks $m_y$ and $m'_x$; y' represents the target domain generated image generated by the source domain image x through the generator $G_{XY}$, and x' represents the source domain generated image generated by the target domain image y and its segmentation mask $m_y$ through the generator $G_{YX}$.

The feature similarity loss function $\mathcal{L}_{fs}$ is specifically expressed as:

$$\begin{aligned}\mathcal{L}_{fs} &= FS(y, y') \\ &= \frac{1}{N}\sum_j \max_i FS_{ij} \\ &= \frac{1}{N}\sum_j \max_i \left(W_{ij} \Big/ \sum_k \omega_{ik}\right) \\ &= \frac{1}{N}\sum_j \max_i \left[\exp\left(\frac{1-\overline{d_{ij}}}{h}\right)\Big/ \sum_k \omega_{ik}\right];\end{aligned}$$

wherein FS(y,y') represents the similarity between the image y and the image y', and $$\max_i FS_{ij}$$

represents a feature i of the image y' that is most similar to a feature j of the image y'; N represents a total number of features of the image y' which is the same as a total number of features of the image y'; h represents a bandwidth parameter, $$\exp\left(\frac{1-\overline{d_{ij}}}{h}\right)$$

represents an exponential operation from distance $d_{ij}$ to $W_{ij}$, $d_{ij}$ represents a normalized similarity distance, $W_{ij}$ represents a similarity, $W_{ij}/\Sigma_k w_{ik}$ represents a normalized similarity, and $w_{ik}$ represents a similarity value of a $k^{th}$ $W_{ij}$.

The advantages of the present invention are as follows.

(1) The present invention provides a method for image shape transformation based on a generative adversarial network, which realizes the transformation between object images with different shapes.

(2) The present invention uses a cycle generator and a discriminator to learn cross-domain mappings, generates an image with a closer basic distribution based on a target instance, and can effectively learn complex segmentation guidance attributes related to shapes and positions.

(3) The present invention proposes a feature similarity loss function to clearly establish a similarity comparison between a source image and a target image.

(4) With low complexity but high image conversion efficiency, the present invention can efficiently process specific images in pictures to perform image transformations with large shape differences, and thus can be used in animation production, poster design and other fields to enhance the reality of image transformation, while reducing labor costs and workload.

DETAILED DESCRIPTION OF THE EMBODIMENTS

The following describes the specific embodiments of the present invention to help those skilled in the art understand the present invention, but it should be clear that the present invention is not limited to the scope of the specific embodiments, for those ordinarily skilled in the art, as long as various changes are within the spirit and scope of the present invention defined and determined by the appended claims, these changes are obvious, and all inventions and creations that utilize the concept of the present invention shall fall within the scope of the present invention.

The embodiments of the present invention will be described in detail below with reference to the drawings.

Figure 1:
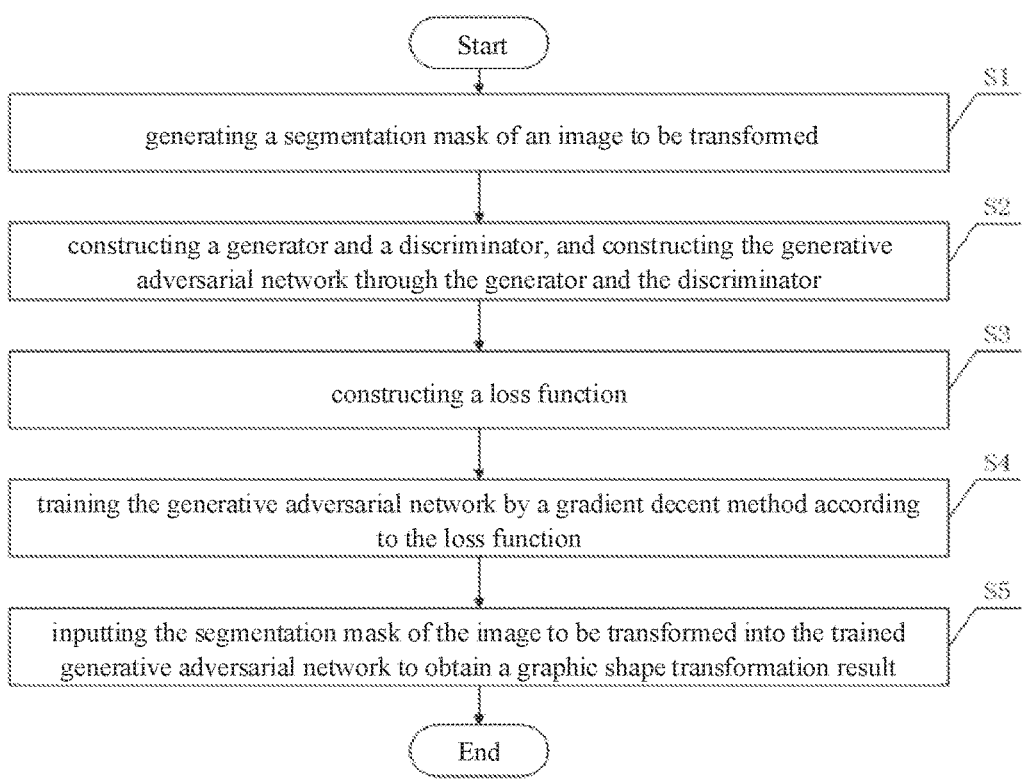
FIG. 1 is a flowchart of a method for image shape transformation based on a generative adversarial network proposed by the present invention.

As shown in FIG. 1, a method for image shape transformation based on a generative adversarial network includes the following steps:

S1: a segmentation mask of an image to be transformed is generated;
S2: a generator and a discriminator are constructed, and the generative adversarial network is constructed through the generator and the discriminator;
S3: a loss function is constructed;
S4: the generative adversarial network is trained by a gradient descent method according to the loss function; and
S5: the segmentation mask of the image to be transformed is input into the trained generative adversarial network to obtain an image shape transformation result.

In the present embodiment, the present invention can be applied to game design, animation design, graphic design, medical imaging, and style transfer. In step S1, the image to be transformed can be a medical image to be transformed, an animated image with a shape to be transformed during the animation design, a game character or architectural image with a shape to be transformed during the game design, or an image to be transformed during the graphic design.

Step S1 specifically includes: generating, for the image to be transformed, a segmentation mask $m_x$ in a source domain X and a segmentation mask $m_y$ in a target domain Y.

Figure 2:
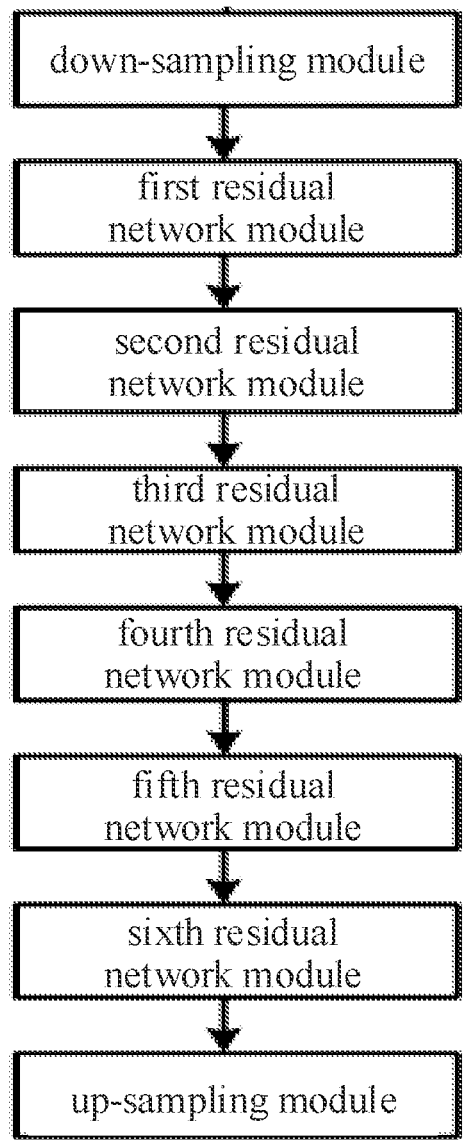
FIG. 2 is a schematic diagram of a generator in the present invention.

As shown in FIG. 2, in step S2, the generator includes the down-sampling module, the first residual network module, the second residual network module, the third residual network module, the fourth residual network module, the fifth residual network module, the sixth residual network module and the up-sampling module connected in sequence.

Figure 3:
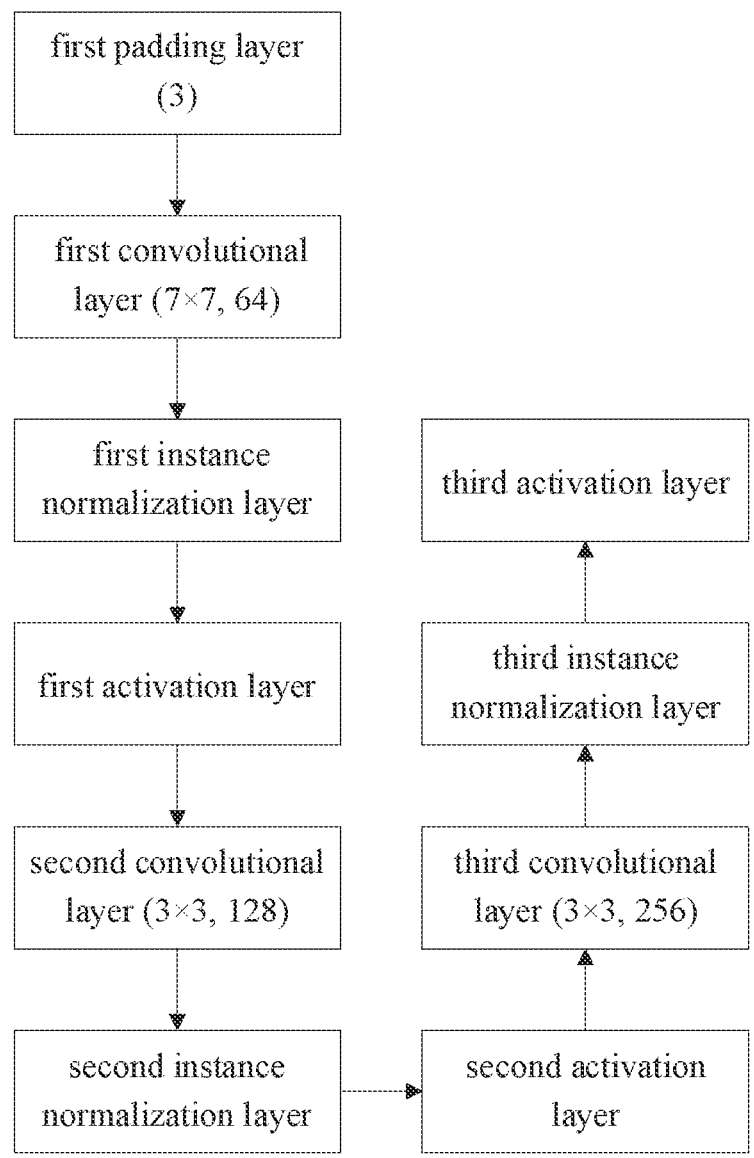
FIG. 3 is a schematic diagram of a down-sampling module in the present invention.

As shown in FIG. 3, the down-sampling module includes the first padding layer ReflectionPad2d(3), the first convolutional layer, the first instance normalization layer, the first activation layer ReLU, the second convolutional layer, the second instance normalization layer, the second activation layer ReLU, the third convolutional layer, the third instance normalization layer and the third activation layer ReLU connected in sequence.

Figure 4:
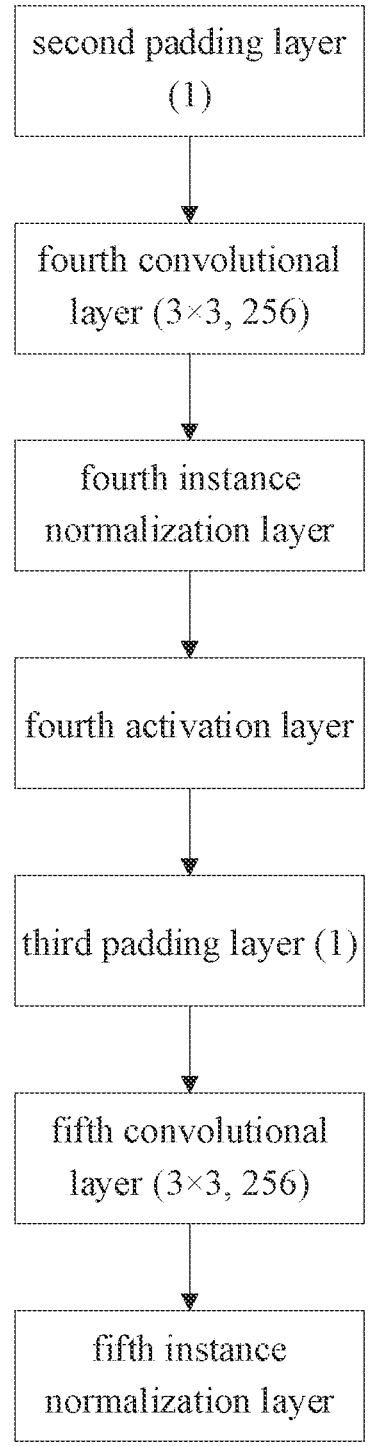
FIG. 4 is a schematic diagram of a residual network module in the present invention.

As shown in FIG. 4, each of the residual network modules includes the second padding layer ReflectionPad2d(1), the fourth convolutional layer, the fourth instance normalization layer, the fourth activation layer ReLU, the third padding layer ReflectionPad2d(1), the fifth convolutional layer and the fifth instance normalization layer connected in sequence.

Figure 5:
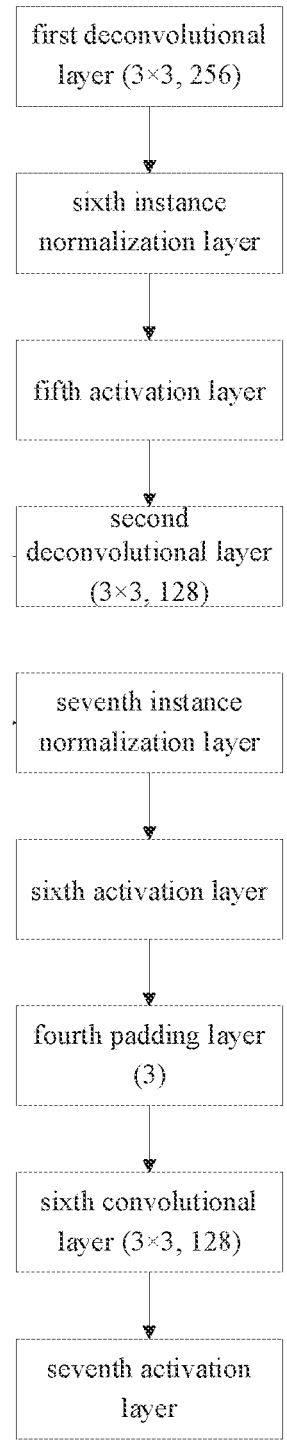
FIG. 5 is a schematic diagram of an up-sampling module in the present invention.

As shown in FIG. 5, the up-sampling module includes the first deconvolutional layer, the sixth instance normalization layer, the fifth activation layer ReLU, the second deconvolutional layer, the seventh instance normalization layer, the sixth activation layer Rail, the fourth padding layer ReflectionPad2d(3), the sixth convolutional layer and the seventh activation layer ReLU connected in sequence.

Figure 6:
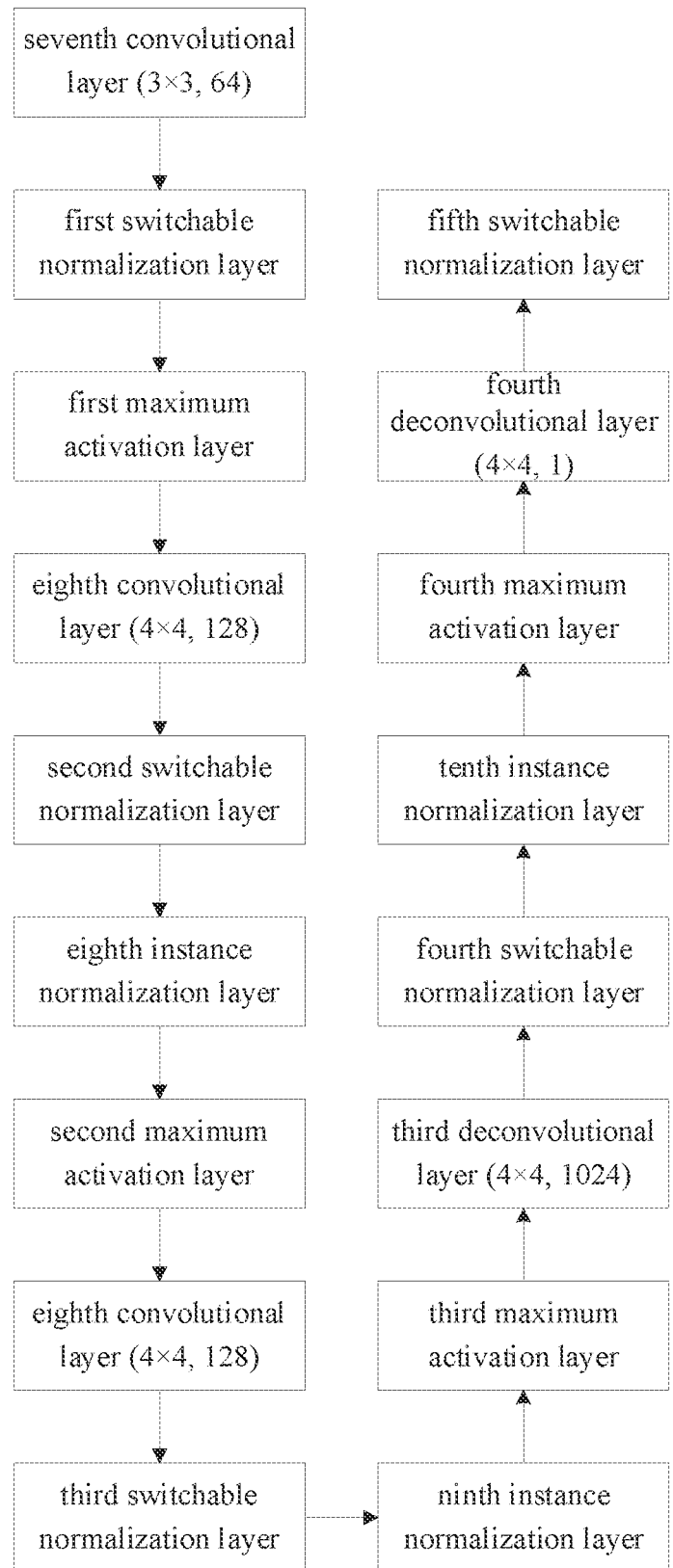
FIG. 6 is a schematic diagram of a discriminator in the present invention.

As shown in FIG. 6, in step S2, the discriminator includes the seventh convolutional layer, the first switchable normalization layer, the first maximum activation layer LeakyReLU, the eighth convolutional layer, the second switchable normalization layer, the eighth instance normalization layer, the second maximum activation layer LeakyReLU, the eighth convolutional layer, the third switchable normalization layer, the ninth instance normalization layer, the third maximum activation layer LeakyReLU, the third deconvolutional layer, the fourth switchable normalization layer, the tenth instance normalization layer, the fourth maximum activation layer LeakyReLU, the fourth deconvolutional layer and the fifth switchable normalization layer connected in sequence.

Figure 7:
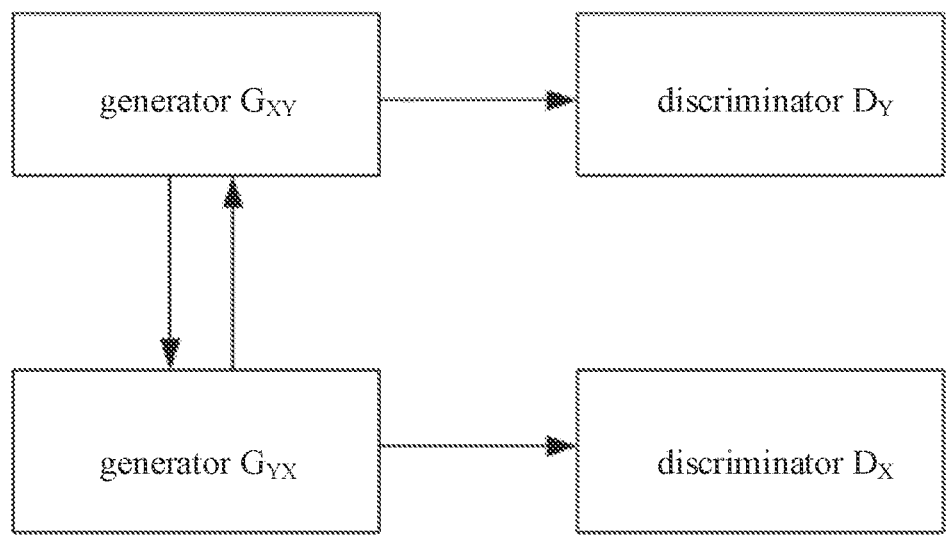
FIG. 7 is a schematic diagram of a generative adversarial network in the present invention.

In step S2, a method for constructing the generative adversarial network through the generator and the discriminator specifically includes:

S2.1: a generator $G_{XY}$ for converting a given image in the source domain X to an image in the target domain Y is constructed, and a generator $G_{YX}$ for converting a given image in the target domain Y to an image in the source domain X is constructed;

S2.2: a discriminator $D_Y$ for predicting whether the image is an image in the target domain is constructed, and a discriminator $D_X$ for predicting whether the image is an image in the source domain is constructed; and S2.3: as shown in FIG. 7, the generator $G_{XY}$ is connected to the generator $G_{YX}$, the generator $G_{XY}$ is connected to the discriminator $D_Y$, and the generator $G_{YX}$ is connected to the discriminator $D_X$, so as to construct the generative adversarial network.

In the present embodiment, the generator includes three modules: a down-sampling module, a residual network module and an up-sampling module.

The down-sampling module converts the input feature vector (1, 4, 256, 256) into a feature vector (1, 256, 64, 64) through a four-layer convolution operation. The residual network module includes six blocks, where the input and output feature vectors have the same dimension. The up-sampling module converts the input feature vector (1, 512, 64, 64) into a feature vector (1, 3, 256, 256) through a five-layer convolution operation.

The discriminator includes two modules: a down-sampling module and a classifier module. The down-sampling module converts the input feature vector (1, 3, 256, 256) into a feature vector (1, 256, 32, 32) through a three-layer convolution operation.

In step S2.3, a one-cycle generation process of the generative adversarial network includes a source domain cycle generation process and a target domain cycle generation process.

The source domain cycle generation process specifically includes:

S2.3.1.1: a source domain image x and its segmentation mask $m_x$ are input into the generator $G_{XY}$ to obtain a first target domain generated image y' and its segmentation mask $m'_y$, which are denoted as $G_{XY}(x,m_x)$;

S2.3.1.2: the target domain generated image y' and its segmentation mask $m'_y$ are input into the generator $G_{YX}$ to obtain a first source domain generated image and its segmentation mask, which are denoted as $G_{YX}(G_{XY}(x,m_x))$;

S2.3.1.3: the first target domain generated image y and its mask $m_y$ as well as a target domain image y and its segmentation mask $m_y$ are input into the discriminator $D_Y$ for discrimination, and $G_{YX}(G_{XY}(x,m_x))$ denoting the first source domain generated image and its segmentation mask is input into the discriminator $D_X$ for discrimination, so as to complete the source domain cycle generation process.

The target domain cycle generation process specifically includes:

S2.3.2.1: the target domain image y and its segmentation mask $m_y$ are input into the generator $G_{YX}$ to obtain a second source domain generated image x' and its segmentation mask $m'_x$, which are denoted as $G_{YX}(y,m_y)$;

S2.3.2.2: the second source domain generated image x' and its segmentation mask $m'_x$ are input into the generator $G_{XY}$ to obtain a second target domain generated image and its segmentation mask, which are denoted as $G_{XY}(G_{YX}(y,m_y))$;

S2.3.2.3: the second source domain generated image x' and its segmentation mask $m'_x$ as well as the source domain image x and its segmentation mask $m_x$ are input into the discriminator $D_X$ for discrimination, and $G_{XY}(G_{YX}(y,m_y))$ denoting the second target domain generated image and its segmentation mask is input into the discriminator $D_Y$ for discrimination, so as to complete the target domain cycle generation process.

In step S3, the loss function $\mathcal{L}_{total}$ is specifically expressed as:

$$\mathcal{L}_{total} = \lambda_{adv}\mathcal{L}_{adv} + \lambda_{cyc}\mathcal{L}_{cyc} + \lambda_{idt}\mathcal{L}_{idt} + \lambda_{ctx}\mathcal{L}_{ctx} + \lambda_{fs}\mathcal{L}_{fs};$$

wherein $\mathcal{L}_{adv}$ represents an adversarial loss function, represents a cycle consistency loss function, $\mathcal{L}_{idt}$ represents an identity loss function, $\mathcal{L}_{ctx}$ represents a context-preserving loss function, $\mathcal{L}_{fs}$ represents a feature similarity loss function, and $\lambda_{adv}$, $\lambda_{cyc}$, $\lambda_{idt}$, $\lambda_{ctx}$ and $\lambda_{fs}$ represent weights of $\mathcal{L}_{adv}$, $\mathcal{L}_{cyc}$, $\mathcal{L}_{idt}$, $\mathcal{L}_{ctx}$ and $\mathcal{L}_{fs}$ in the loss function $\mathcal{L}_{total}$, respectively.

The adversarial loss function $\mathcal{L}_{adv}$ is specifically expressed as:

$$\mathcal{L}_{adv} = (D_X(x,m_x)-1)^2 + D_X(G_{YX}(y,m_y))^2 + (D_Y(y,m_y)-1)^2 + D_Y(G_{XY}(x,m_x))^2;$$

wherein, $D_X(x,m_x)$ represents a discriminant output of the discriminator $D_X$ for the source domain image x and its segmentation mask $m_x$, $D_X(G_{YX}(y,m_y))$ represents a discriminant output of the discriminator $D_X$ for $G_{YX}(y,m_y)$ denoting the source domain generated image and its segmentation mask, $G_{YX}(y,m_y)$ represents the source domain generated image and its mask generated by the target domain image y and its segmentation mask m through the generator $G_{YX}$, $D_Y(y,m_y)$ represents a discriminant output of the discriminator $D_Y$ for the target domain image y and its segmentation mask $m_y$, $D_Y(G_{XY}(x,m_x))$ represents a discriminant output of the discriminator $D_Y$ for the target domain generated image and its segmentation mask $G_{XY}(x,m_x)$ $G_{XY}(x,m_x)$ represents the target domain generated image and its segmentation mask generated by the source domain image x and its segmentation mask $m_x$ through the generator $G_{XY}$.

The cycle consistency loss function $\mathcal{L}_{cyc}$ is specifically expressed as:

$$\mathcal{L}_{cyc} = \|G_{XY}(G_{YX}(x,m_x))-(x,m_x)\|_1 + \|G_{YX}(G_{XY}(y,m_y))-(y,m_y)\|_1;$$

wherein $G_{YX}(G_{XY}(x,m_x))$ represents the source domain generated image and its segmentation mask generated by $G_{XY}(x,m_x)$ through the generator $G_{YX}$, $G_{XY}(G_{YX}(y,m_y))$ represents the target domain generated image and its segmentation mask generated by $G_{YX}(y,m_y)$ through the generator $G_{XY}$, and $\|*\|_1$ represents 1-norm.

The identity loss function $\mathcal{L}_{idt}$ is specifically expressed as:

$$\mathcal{L}_{idt} = \|G_{XY}(y,m_y)-(y,m_y)\|_1 + \|G_{YX}(x,m_x)-(x,m_x)\|_1;$$

wherein $G_{XY}(y,m_y)$ represents the segmentation mask of the first target domain generated image y obtained after the source domain image x and its segmentation mask $m_x$ are input to the generator $G_{XY}$, and $G_{YX}(x,m_x)$ represents the segmentation mask of the second source domain generated image x' obtained after the target domain image y and its segmentation mask $m_y$ are input into the generator $G_{YX}$.

The context-preserving loss function $\mathcal{L}_{ctx}$ is specifically expressed as:

$$\mathcal{L}_{ctx} = \|\omega(m_x,m'_y)e(x-y')\|_1 + \|\omega(m_y,m'_x)e(y-x')\|_1;$$

wherein $\omega(m_x,m'_y)$ represents a minimum value obtained by subtracting one from elements in binary object masks through segmentation masks $m_x$ and $m'_y$, and $\omega(m_y, m'_x)$ represents a minimum value obtained by subtracting one from elements in binary object masks through segmentation masks $m_y$ and $m'_x$; y' represents the target domain generated image generated by the source domain image x through the generator $G_{XY}$, and x' represents the source domain generated image generated by the target domain image y and its segmentation mask $m_y$ through the generator $G_{YX}$.

The feature similarity loss function $\mathcal{L}_s$ is specifically expressed as:

$$\mathcal{L}_{fs} = FS(y, y')$$
$$= \frac{1}{N}\sum_j \max_i FS_{ij}$$
$$= \frac{1}{N}\sum_j \max_i \left(W_{ij} \bigg/ \sum_k \omega_{ik}\right)$$
$$= \frac{1}{N}\sum_j \max_i \left[\exp\left(\frac{1-\overline{d_{ij}}}{h}\right) \bigg/ \sum_k \omega_{ik}\right];$$

wherein FS(y,y') represents the similarity between the image y and the image y', and $$\max_i FS_{ij}$$

represents a feature i of the image y that is most similar to a feature j of the image y'; N represents the total number of features of the image y, which is the same as the total number of features of the image y'; h represents a bandwidth parameter, $$\exp\left(\frac{1-\overline{d_{ij}}}{h}\right)$$

represents an exponential operation from distance $d_{ij}$ to $W_{ij}$, $d_{ij}$ represents a normalized similarity distance, $W_{ij}$ represents a similarity, $W_{ij}/\Sigma_k w_{ik}$ represents normalized similarity, and $w_{ik}$ represents a similarity value of the $k^{th}$ $W_{ij}$.

The similarity FS(y,y') between the two images is calculated by using these high-level features. Specifically, in a forward process, each layer generates a feature map, a real image y' obtained from real training data includes the feature $y_i$, while a composite image y' includes the feature $y'_j$. The content attribute and style attribute of the feature $y'_j$ are consistent with those of a real domain data set. Assuming that the two images have the same number N of features, where N=|R|=|F|. The most similar feature $y_i$ of each $y'_j$ is found, that is, maxFS$_{ij}$. Then, all similarity values of $y'_j$ are added to calculate a context similarity value between the two images. Finally, the context similarity value is divided by N to obtain an average similarity FS(y,y').

The advantages of the present invention are as follows.

(1) The present invention provides a method for image shape transformation based on a generative adversarial network, which realizes the transformation between objet images with different shapes.

(2) The present invention uses a cycle generator and a discriminator to learn cross-domain mappings, generates an image with a closer basic distribution based on a target instance, and can effectively learn complex segmentation guidance attributes related to shapes and positions.

(3) The present invention proposes a feature similarity loss function to clearly establish a similarity comparison between a source image and a target image.

(4) With low complexity but high image conversion efficiency, the present invention can efficiently process specific images in pictures to perform image transformations with large shape differences, and thus can be used in animation production, poster design and other fields to enhance the reality of image transformation, while reducing labor costs and workload.

What is claimed is:

1. A method for an image shape transformation based on a generative adversarial network, comprising the following steps:
   S1: generating a segmentation mask of an image to be transformed;
   S2: constructing a generator and a discriminator, and constructing the generative adversarial network through the generator and the discriminator;
   S3: constructing a loss function;
   S4: training the generative adversarial network by a gradient descent method according to the loss function to obtain a trained generative adversarial network; and
   S5: inputting the segmentation mask of the image to be transformed into the trained generative adversarial network to obtain an image shape transformation result,
   wherein step S1 specifically comprises:
      generating, for the image to be transformed, a segmentation mask $m_x$ in a source domain X and a segmentation mask $m_y$ in a target domain Y.

2. The method of claim 1, wherein
   in step S2, the generator comprises a down-sampling module, a first residual network module, a second residual network module, a third residual network module, a fourth residual network module, a fifth residual network module, a sixth residual network module and an up-sampling module connected in sequence;
   the down-sampling module comprises a first padding layer, a first convolutional layer, a first instance normalization layer, a first activation layer, a second convolutional layer, a second instance normalization layer, a second activation layer, a third convolutional layer, a third instance normalization layer and a third activation layer connected in sequence;
   each of the first residual network module, the second residual network module, the third residual network module, the fourth residual network module, the fifth residual network module and the sixth residual network module comprises a second padding layer, a fourth convolutional layer, a fourth instance normalization layer, a fourth activation layer, a third padding layer, a fifth convolutional layer and a fifth instance normalization layer connected in sequence; and
   the up-sampling module comprises a first deconvolutional layer, a sixth instance normalization layer, a fifth activation layer, a second deconvolutional layer, a seventh instance normalization layer, a sixth activation layer, a fourth padding layer, a sixth convolutional layer and a seventh activation layer connected in sequence.

3. The method of claim 1, wherein
   in step S2, the discriminator comprises a seventh convolutional layer, a first switchable normalization layer, a first maximum activation layer, a top eighth convolutional layer, a second switchable normalization layer, an eighth instance normalization layer, a second maximum activation layer, a bottom eighth convolutional layer, a third switchable normalization layer, a ninth instance normalization layer, a third maximum activation layer, a third deconvolutional layer, a fourth switchable normalization layer, a tenth instance normalization layer, a fourth maximum activation layer, a fourth deconvolutional layer and a fifth switchable normalization layer connected in sequence.

4. The method of claim 1, wherein
in step S2, a method for constructing the generative adversarial network through the generator and the discriminator specifically comprises:
S2.1: constructing a generator $G_{XY}$ for converting a given image in a source domain X to an image in a target domain Y, and constructing a generator $G_{YX}$ for converting a given image in the target domain Y to an image in the source domain X;
S2.2: constructing a discriminator $D_Y$ for predicting whether the image is an image in the target domain, and constructing a discriminator $D_X$ for predicting whether the image is an image in the source domain; and
S2.3: connecting the generator $G_{XY}$ to the generator $G_{YX}$, connecting the generator $G_{XY}$ to the discriminator $D_Y$, and connecting the generator $G_{YX}$ to the discriminator $D_X$, to construct the generative adversarial network.

5. The method of claim 4, wherein
in step S2.3, a one-cycle generation process of the generative adversarial network comprises a source domain cycle generation process and a target domain cycle generation process;
the source domain cycle generation process specifically comprises:
S2.3.1.1: inputting a source domain image x and a segmentation mask $m_x$ of the source domain image x into the generator $G_{XY}$ to obtain a first target domain generated image y' and a segmentation mask $m'_y$ of the first target domain generated image y', wherein the first target domain generated image y' and the segmentation mask $m'_y$ are denoted as $G_{XY}(x,m_x)$;
S2.3.1.2: inputting the first target domain generated image y' and the segmentation mask $m'_y$ of the first target domain generated image y' into the generator $G_{YX}$ to obtain a first source domain generated image and a segmentation mask of the first source domain generated image, wherein the first source domain generated image and the segmentation mask of the first source domain generated image are denoted as $G_{YX}(G_{XY}(x, m_x))$;
S2.3.1.3: inputting the first target domain generated image y', the segmentation mask $m_y'$ of the first target domain generated image y', a target domain image y, and a segmentation mask $m_y$ of the target domain image y into the discriminator $D_Y$ for a first discrimination, and inputting $G_{YX}(G_{XY}(x,m_x))$ denoting the first source domain generated image and the segmentation mask of the first source domain generated image into the discriminator $D_X$ for a second discrimination, to complete the source domain cycle generation process;
the target domain cycle generation process specifically comprises:
S2.3.2.1: inputting the target domain image y and the segmentation mask $m_y$ of the target domain image y into the generator $G_{YX}$ to obtain a second source domain generated image x' and a segmentation mask $m'_x$ of the second source domain generated image x', wherein the second source domain generated image x' and the segmentation mask $m'_x$ of the second source domain generated image x' are denoted as $G_{YX}(y,m_y)$;
S2.3.2.2: inputting the second source domain generated image x' and the segmentation mask $m'_x$ of the second source domain generated image x' into the generator $G_{XY}$ to obtain a second target domain generated image and a segmentation mask of the second target domain generated image, wherein the second target domain generated image and the segmentation mask of the second target domain generated image are denoted as $G_{XY}(G_{YX}(y,m_y))$; and
S2.3.2.3: inputting the second source domain generated image x', the segmentation mask $m'_x$ of the second source domain generated image x', the source domain image x, and the segmentation mask $m_x$ of the source domain image x into the discriminator $D_X$ for a third discrimination, and inputting $G_{XY}(G_{YX}(y,m_y))$ denoting the second target domain generated image and the segmentation mask of the second target domain generated image into the discriminator $D_Y$ for a fourth discrimination, to complete the target domain cycle generation process.

6. The method of claim 1, wherein
the loss function $\mathcal{L}_{total}$ in step S3 is specifically expressed as:

$$\mathcal{L}_{total} = \lambda_{adv}\mathcal{L}_{adv} + \lambda_{cyc}\mathcal{L}_{cyc} + \lambda_{idt}\mathcal{L}_{idt} + \lambda_{ctx}\mathcal{L}_{ctx} + \lambda_{fs}\mathcal{L}_{fs};$$

wherein $\mathcal{L}_{adv}$ represents an adversarial loss function, $\mathcal{L}_{cyc}$ represents a cycle consistency loss function, $\mathcal{L}_{idt}$ represents an identity loss function, $\mathcal{L}_{ctx}$ represents a context-preserving loss function, $\mathcal{L}_{fs}$ represents a feature similarity loss function, and $\lambda_{adv}, \lambda_{cyc}, \lambda_{idt}, \lambda_{ctx}$ and $\lambda_{fs}$ represent weights of $\mathcal{L}_{adv}, \mathcal{L}_{cyc}, \mathcal{L}_{idt}, \mathcal{L}_{ctx}$ and $\mathcal{L}_{fs}$ in the loss function $\mathcal{L}_{total}$, respectively.

7. The method of claim 6, wherein
the adversarial loss function $\mathcal{L}_{adv}$ is specifically expressed as:

$$\mathcal{L}_{adv} = (D_X(x,m_x)-1)^2 + D_X(G_{YX}(y,m_y))^2 + (D_Y(y,m_y)-1)^2 + D_Y(G_{XY}(x,m_x))^2$$

wherein, $D_X(x,m_x)$ represents a discriminant output of a discriminator $D_X$ for a source domain image x and a segmentation mask $m_x$ of the source domain image x, $D_X(G_{YX}(y,m_y))$ represents a discriminant output of the discriminator $D_X$ for $G_{YX}(y,m_y)$ denoting a second source domain generated image and a segmentation mask of the second source domain generated image, $G_{YX}(y,m_y)$ represents the second source domain generated image and the segmentation mask of the second source domain generated image generated by a target domain image y and a segmentation mask $m_y$ of the target domain image y through a generator $G_{YX}$, $D_Y(y,m_y)$ represents a discriminant output of a discriminator y for the target domain image y and the segmentation mask $m_y$ of the target domain image y, $D_Y(G_{XY}(x,m_x))$ represents a discriminant output of the discriminator $D_Y$ for $G_{XY}(x,m_x)$ denoting a first target domain generated image and a segmentation mask of the first target domain generated image, $G_{XY}(x,m_x)$ represents the first target domain generated image and the segmentation mask of the first target domain generated image generated by the source domain image x and the segmentation mask $m_x$ of the source domain image x through a generator $G_{XY}$;
the cycle consistency loss function CYC is specifically expressed as:

$$\mathcal{L}_{cyc} = \lambda \|G_{YX}(G_{XY}(x,m_x))-(x,m_x)\|_1 + \|G_{XY}(G_{YX}(y,m_y))-(y,m_y)\|_1;$$

wherein $G_{YX}(G_{XY}(x,m_x))$ represents the first source domain generated image and the segmentation mask of the first source domain generated image generated by $G_{XY}(x,m_x)$ through the generator $G_{YX}$, $G_{XY}(G_{YX}(y,m_y))$ represents the second target domain generated image and the segmentation mask of the second target domain generated image generated by $G_{YX}(y,m_y)$ through the generator $G_{XY}$, and $\|*\|_1$ represents a 1-norm;

the identity loss function $\mathcal{L}_{idt}$ is specifically expressed as:

$$\mathcal{L}_{idt}=\|G_{XY}(y,m_y)-(y,m_y)\|_1+\|G_{YX}(x,m_x)-(x,m_x)\|_1;$$

wherein $G_{XY}(y,m_y)$ represents the segmentation mask of the first target domain generated image y' obtained after the source domain image x and the segmentation mask $m_x$ of the source domain image x are input to the generator $G_{XY}$, and $G_{YX}(x,m_x)$ represents the segmentation mask of the second source domain generated image x' obtained after the target domain image y and the segmentation mask $m_y$ of the target domain image y are input into the generator $G_{YX}$;

the context-preserving loss function $\mathcal{L}_{ctx}$ is specifically expressed as:

$$\mathcal{L}_{ctx}=\|\omega(m_x,m'_y)\square(x-y')\|_1+\|\omega(m_y,m'_x)\square(y-x')\|_1;$$

wherein $\omega(m_x,m'_y)$ represents a minimum value obtained by subtracting one from elements in binary object masks through the segmentation mask $m_x$ of the source domain image x and the segmentation mask $m_y$ of the first target domain generated image y', and $\omega(m_y, m'_x)$ represents a minimum value obtained by subtracting one from the elements in the binary object masks through the segmentation mask $m_y$ of the target domain image y and the segmentation mask $m_x$ of the second source domain generated image x'; y' represents the first target domain generated image generated by the source domain image x through the generator $G_{XY}$, x' represents the second source domain generated image generated by the target domain image y and the segmentation mask $m_y$ of the target domain image y through the generator $G_{YX}$;

the feature similarity loss function $\mathcal{L}_{fs}$ is specifically expressed as:

$$\begin{aligned}\mathcal{L}_{fs} &= FS(y, y') \\ &= \frac{1}{N}\sum_j \max_i FS_{ij} \\ &= \frac{1}{N}\sum_j \max_i \left(W_{ij} \Big/ \sum_k \omega_{ik}\right) \\ &= \frac{1}{N}\sum_j \max_i \left[\exp\left(\frac{1-\overline{d_{ij}}}{h}\right) \Big/ \sum_k \omega_{ik}\right];\end{aligned}$$

wherein $FS(y,y')$ represents a similarity between an image y and an image y', and $\max_i FS_{ij}$ represents a feature i of the image y, wherein the feature i of the image y is most similar to a feature j of the image y'; N represents a total number of features of the image y, and N is the same as a total number of features of the image y'; h represents a bandwidth parameter, $$\exp\left(\frac{1-\overline{d_{ij}}}{h}\right)$$

represents an exponential operation from a distance $d_{ij}$ to $w_{ij}$, $d_{ij}$ represents a normalized similarity distance, $W_{ij}$ represents a similarity, $W_{ij}/\Sigma_k w_{ik}$ represents a normalized similarity, and $w_{ik}$ represents a similarity value of a kth $W_{ij}$.

\* \* \* \* \*